US012610013B2

(12) United States Patent
Kim

(10) Patent No.: US 12,610,013 B2
(45) Date of Patent: Apr. 21, 2026

(54) METHOD AND DEVICE FOR DYNAMIC BACKHAUL NETWORK DELAY-BASED SESSION MANAGEMENT IN WIRELESS COMMUNICATION SYSTEM

(71) Applicant: Samsung Electronics Co., Ltd., Suwon-si (KR)

(72) Inventor: Dongyeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 18/309,474

(22) Filed: Apr. 28, 2023

(65) Prior Publication Data
US 2023/0362305 A1 Nov. 9, 2023

(30) Foreign Application Priority Data

May 4, 2022 (KR) ........................ 10-2022-0055504

(51) Int. Cl.
*H04M 15/00* (2024.01)
*H04W 24/08* (2009.01)
(Continued)

(52) U.S. Cl.
CPC ........... *H04M 15/66* (2013.01); *H04W 24/08* (2013.01); *H04W 28/0268* (2013.01); *H04W 84/06* (2013.01)

(58) Field of Classification Search
CPC . H04W 24/08; H04W 28/0268; H04W 84/06; H04L 41/0894; H04L 63/205; H04L 12/1407; H04M 15/66; H04M 15/8016
See application file for complete search history.

(56) References Cited

U.S. PATENT DOCUMENTS 11,622,322 B1 * 4/2023 Weisbrod .............. H04W 48/16
370/329
11,678,252 B2 * 6/2023 Dao ........................ H04W 8/08
370/329
(Continued)

FOREIGN PATENT DOCUMENTS

CN 112771928 A 5/2021
CN 113965965 A 1/2022
(Continued)

OTHER PUBLICATIONS

Translation of CN 113965965, 25 pages (Year: 2020).*
(Continued)

*Primary Examiner* — Mong-Thuy T Tran

(57) ABSTRACT

The disclosure relates to a 5G or 6G communication system for supporting a higher data transmission rate. According to an aspect of the disclosure, a method by a session management function (SMF) in a wireless communication system may comprise receiving, from an access and mobility management function (AMF), a first message including information indicating that a dynamic satellite backhaul is used; transmitting, to a policy control function (PCF), a second message indicating that the dynamic satellite backhaul is used based on receiving the first message, wherein the PCF triggers a quality of service (QOS) monitoring operation for the dynamic satellite backhaul based on the second message.

20 Claims, 6 Drawing Sheets

PCC Rule Information

Information Name: QoS Monitoring for dynamic satellite backhaul delay control

· QoS parameter(s) to be measured : UL packet delay, DL packet delay, or round trip packet delay · Reporting frequency : event triggered, periodic, when packet delay exceeds the Threshold Value · Threshold Value(s) : UL packet delay, DL packet delay, or round trip packet delay · Target of reporting: Defines the target of the QoS Monitoring reports, it can be the PCF or
the AF or the Local NEF, decided by the PCF · Indication of direct event notification: Indicates that the QoS Monitoring event shall be reported
by the UPF directly to the NF indicated by the Target of reporting

(51) Int. Cl.
　　*H04W 28/02*　　　(2009.01)
　　*H04W 84/06*　　　(2009.01)

(56)　　　　　　References Cited

U.S. PATENT DOCUMENTS

| | | | | |
|---|---|---|---|---|
| 2020/0396000 | A1* | 12/2020 | Ryu | H04W 76/25 |
| 2021/0211316 | A1* | 7/2021 | Raleigh | H04L 47/805 |
| 2021/0399796 | A1* | 12/2021 | Ryu | H04B 7/185 |
| 2023/0135699 | A1* | 5/2023 | Liao | H04W 4/50 |
| | | | | 370/252 |
| 2023/0276344 | A1* | 8/2023 | Dao | H04M 15/8016 |
| | | | | 370/329 |
| 2023/0308547 | A1* | 9/2023 | Hietalahti | H04L 12/1407 |
| 2023/0413142 | A1* | 12/2023 | Hong | H04W 36/30 |
| 2024/0007314 | A1* | 1/2024 | Yao | H04L 12/1435 |
| 2025/0023630 | A1* | 1/2025 | Li | H04L 41/0894 |

FOREIGN PATENT DOCUMENTS

| | | | | | |
|---|---|---|---|---|---|
| EP | 4247103 | A1 | | 9/2023 | |
| EP | 4325926 | B1 | * | 2/2025 | H04W 88/14 |
| WO | 2021-235879 | A1 | | 11/2021 | |

OTHER PUBLICATIONS

Supplementary European Search Report dated Feb. 28, 2025, in connection with European Application No. 23799612.9, 9 pages.

CATT, "Solution for KI#1: QoS control enhancements for dynamic satellite backhauling," S2-2202586 (revision of S2-220xxxx), SA WG2 Meeting #150E, Apr. 6-12, 2022, 4 pages.

International Search Report and Written Opinion of the International Searching Authority dated Jul. 28, 2023, in connection with International Application No. PCT/KR2023/005682, 8 pages.

3GPP TR 23.700-27 V0.2.0 (Apr. 2022), Technical Report, 3rd Generation Partnership Project; Technical Specification Group Services and System Aspects; Study on 5G System with Satellite Backhaul (Release 18), Apr. 2022, 30 pages.

Qualcomm Incorporated, "Update solution#8 for Key Issue #4: QoS Monitoring," S2-1900493, 3GPP TSG SAWG2 Meeting #130, Kochi, India, Jan. 21-25, 2019, 9 pages.

Xiaomi, "Policy control based on satellite category," S2-2007727, 3GPP TSG SA WG2 Meeting #141e (e-meeting), Oct. 12-26, 2020, 15 pages.

Ericsson, "Backhaul satellite category per network instance," S2-2008453 (Revision of S2-20xxxxx), 3GPP TSG SA WG2 Meeting #142e, Nov. 16-20, 2020, 2 pages.

* cited by examiner

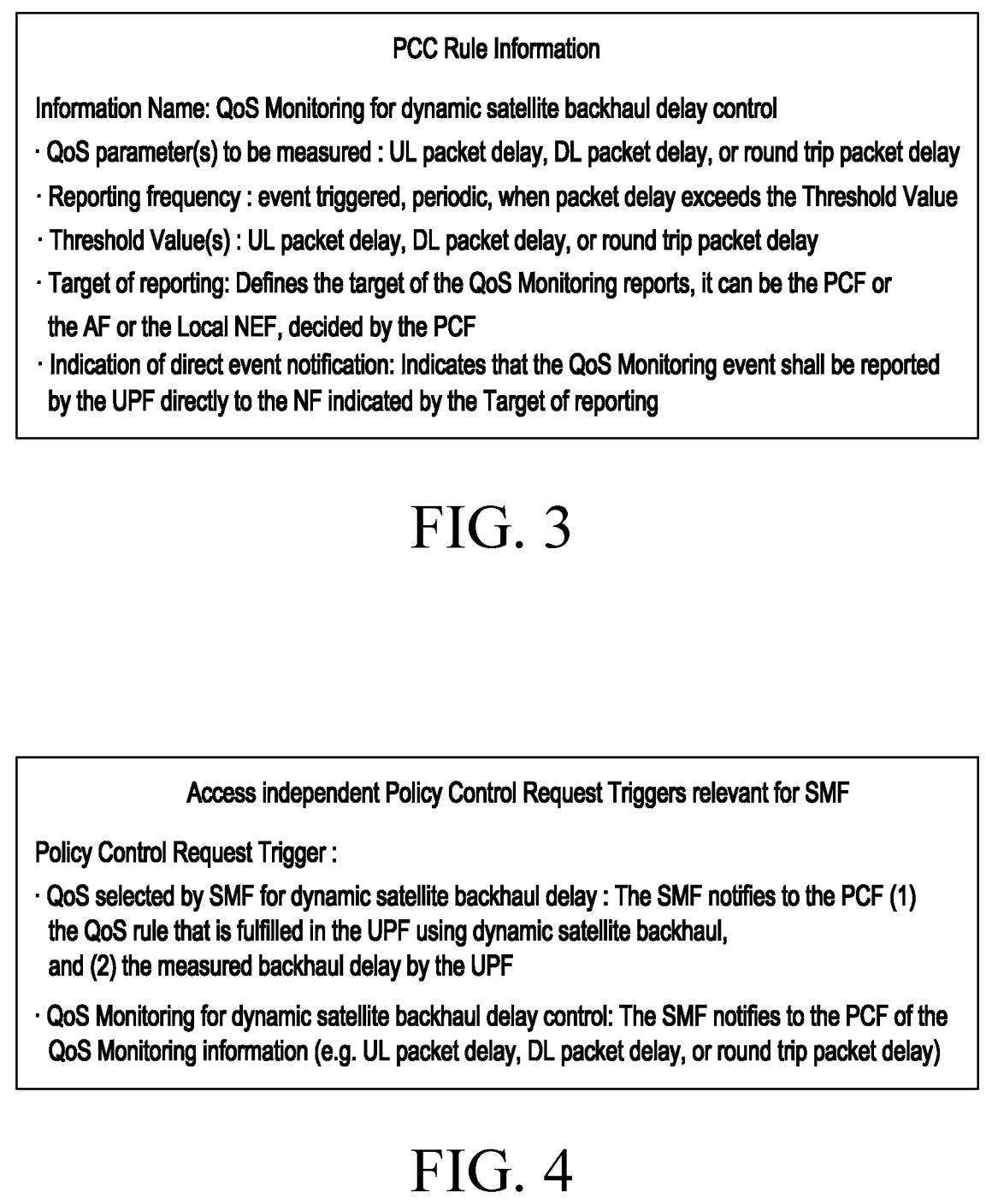

PCC Rule Information

Information Name: QoS Monitoring for dynamic satellite backhaul delay control

· QoS parameter(s) to be measured : UL packet delay, DL packet delay, or round trip packet delay · Reporting frequency : event triggered, periodic, when packet delay exceeds the Threshold Value · Threshold Value(s) : UL packet delay, DL packet delay, or round trip packet delay · Target of reporting: Defines the target of the QoS Monitoring reports, it can be the PCF or the AF or the Local NEF, decided by the PCF · Indication of direct event notification: Indicates that the QoS Monitoring event shall be reported by the UPF directly to the NF indicated by the Target of reporting

FIG. 3

Access independent Policy Control Request Triggers relevant for SMF

Policy Control Request Trigger :

· QoS selected by SMF for dynamic satellite backhaul delay : The SMF notifies to the PCF (1) the QoS rule that is fulfilled in the UPF using dynamic satellite backhaul, and (2) the measured backhaul delay by the UPF · QoS Monitoring for dynamic satellite backhaul delay control: The SMF notifies to the PCF of the QoS Monitoring information (e.g. UL packet delay, DL packet delay, or round trip packet delay)

FIG. 4

METHOD AND DEVICE FOR DYNAMIC BACKHAUL NETWORK DELAY-BASED SESSION MANAGEMENT IN WIRELESS COMMUNICATION SYSTEM

CROSS-REFERENCE TO RELATED APPLICATION

This application is based on and claims priority under 35 U.S.C. § 119 to Korean Patent Application No. 10-2022-0055504, which was filed in the Korean Intellectual Property Office on May 4, 2022, the entire disclosure of which is incorporated herein by reference.

BACKGROUND

1. Field

The disclosure relates to a method and device for dynamic backhaul network delay-based session management in a wireless communication system.

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Various embodiments of the disclosure provide a method and device for dynamic backhaul network delay-based session management in a wireless communication system.

Objects of the disclosure are not limited to the foregoing, and other unmentioned objects would be apparent to one of ordinary skill in the art from the following description.

According to an embodiment, a method by a session management function (SMF) in a wireless communication system may comprise receiving, from an access and mobility management function (AMF), a first message including information indicating that a dynamic satellite backhaul is used; transmitting a second message indicating that the dynamic satellite backhaul is used, based on receiving the first message to a policy control function (PCF) which triggers quality of service (QOS) monitoring for the dynamic satellite backhaul based on the second message.

As an embodiment, the method may further comprise receiving from the PCF entity, a third message including policy control and charging (PCC) rule information and policy control request trigger condition information related to the SMF in response to the second message.

As an embodiment, the PCC rule information may include quality of service (QoS) monitoring information for dynamic satellite backhaul delay control. The QoS monitoring information may include at least one of information indicating at least one QoS parameter to be measured, information indicating a reporting frequency, information indicating a threshold associated with the at least one QoS parameter to be measured, information indicating a target for reporting, and information indicating whether to directly notify of an event.

As an embodiment, the PCC rule information may further include at least one of a QoS parameter set and an alternative QoS parameter set for the dynamic satellite backhaul delay.

As an embodiment, the policy control request trigger condition information related to the SMF may include at least one of a first policy control request trigger condition for a case in which the SMF recognizes a QoS parameter that may be satisfied through a satellite backhaul network in which a network delay may dynamically change in a user plane function (UPF) and a second policy control request trigger condition for QoS monitoring for the dynamic satellite backhaul delay control.

As an embodiment, the method may further comprise selecting a UPF based on a delay of a backhaul network associated with a user plane.

As an embodiment, the method may further comprise transmitting, to the PCF, a session management policy modification request message including a measurement value of a delay of a backhaul network associated with a user plane and receiving, from the PCF, a session management policy modification response message including the PCC rule information and the policy control request trigger condition information.

As an embodiment, the method may further comprise transmitting, to an AMF, at least one of QOS monitoring indicator information, QoS monitoring reporting frequency information, and QoS monitoring threshold information generated based on the QoS monitoring information.

As an embodiment, the method may further comprise transmitting, to the UPF, QoS monitoring policy information generated based on the QoS monitoring information. The QoS monitoring policy information may be used by the UPF to measure a network delay of section N3.

As an embodiment, the first message may comprise satellite backhaul category information and the dynamic satellite backhaul delay control request indicator.

According to an embodiment, an apparatus of a session management function (SMF) in a wireless communication system may comprise a transceiver; and a controller coupled to the transceiver. The controller may be configured to receive, from an access and mobility management function (AMF), a first message including information indicating that a dynamic satellite backhaul is used, transmit a second message indicating that the dynamic satellite backhaul is used, based on receiving the first message to a policy control function (PCF) which triggers quality of service (QOS) monitoring for the dynamic satellite backhaul based on the second message.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 3 illustrates a method for managing policy control and charging rules based on a dynamic backhaul network delay according to an embodiment of the present disclosure;

FIG. 4 illustrates a method for managing policy control and charging rules based on a dynamic backhaul network delay according to an embodiment of the present disclosure;

DETAILED DESCRIPTION

Figure 1:
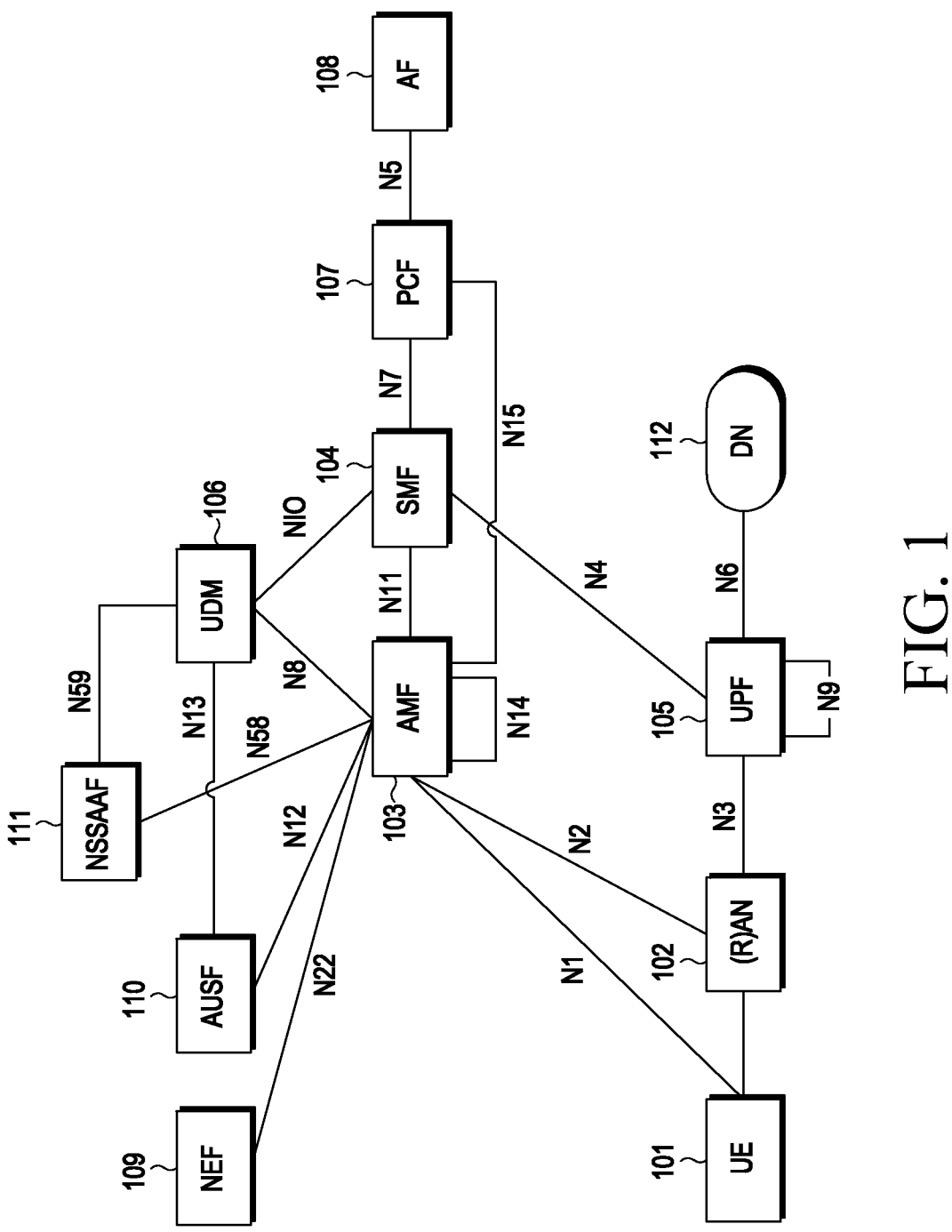
FIG. 1 illustrates a structure of a 5G system according to an embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operational principle of the disclosure is described below with reference to the accompanying drawings.

In describing embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a "unit" is not limited to software or hardware. A "unit" may be configured in a storage medium that may be addressed or may be configured to execute one or more processors. Accordingly, as an example, a "unit" includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the "units" may be combined into smaller numbers of components and "units" or further separated into additional components and "units." Further, the components and "units" may be implemented to execute one or more CPUs in a device or secure multimedia card. According to embodiments, a " . . . unit" may include one or more processors.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited by the terms, and such terms may be replaced with other terms denoting objects with equivalent technical concept.

For ease of description, the terms and names defined in the 3rd generation partnership project long term evolution (3GPP LTE) and/or 3GPP 5G standards may be used herein. However, the disclosure is not limited by such terms and names and may be likewise applicable to systems conforming to other standards.

Advances in satellite communication technology led to efforts to integrate satellite communication technology, which has been in limited use, into a mobile communication network. In particular, research is being conducted to introduce a satellite link in a backhaul section (a section between the radio access network (RAN) and the core network) connected by a legacy optical fiber-based wired link.

The 3rd generation partnership project (3GPP) is standardizing various scenarios for integrating mobile communication and 5G technology in a 5th generation (5G) communication system. In particular, a method of introducing a satellite connection in the backhaul section connecting the radio access network (RAN) and the core network is being standardized. Satellite connection has various advantages, such as reducing the cost of constructing a wired link (such as installing an embedded optical fiber cable). Meanwhile, when satellite technology is applied to the backhaul section, phenomena such as a variable network situation or a high latency may occur, and an additional mechanism for satisfying quality of service (QOS) in the 5G system may be required.

When satellite technology is applied to the backhaul section, a higher latency may occur compared to using the terrestrial backhaul network in transmitting control signals and user data through the RAN installed on the ground or the core network. Due to such a high latency, it may be necessary to change the session management method including selection of a network function (NF) for session management and selection of a QoS profile for policy and billing management.

Accordingly, a need may exist for a technology for determining a policy control and billing rule satisfying QoS requirements of a service when a high-delay time may occur in the backhaul section due to use of a non-terrestrial backhaul network including a satellite or characteristics of other backhaul networks, and furthermore, when the delay time in the backhaul section is dynamically changed.

Various embodiments of the disclosure may provide a method and device for dynamic backhaul network delay-based session management in a wireless communication system.

Objects of the disclosure are not limited to the foregoing, and other unmentioned objects would be apparent to one of ordinary skill in the art from the following description.

Hereinafter, various embodiments of the disclosure are described in detail with reference to the accompanying drawings. In this case, it should be noted that the same components in the accompanying drawings are indicated by the same reference numerals as much as possible. Further, it should be noted that the accompanying drawings of the disclosure are provided to aid understanding of the disclosure, and the disclosure is not limited to the form or arrangement illustrated in the drawings of the disclosure.

FIG. 1 illustrates a structure of a 5G system related to an embodiment of the present disclosure.

Referring to FIG. 1, a 5G system architecture may include various components (e.g., network functions (NFs)). FIG. 1 illustrates some of the components, including an authentication server function (AUSF) device 110, a (core) access and mobility management function (AMF) device 103, a session management function (SMF) device 104, a policy control function (PCF) device 107, an application function (AF) device 108, a unified data management (UDM) device 106, a data network (DN) 112, a user plane function (UPF) device 105, a (radio) access network (R) AN 102, and a terminal, i.e., a user equipment (UE) 101. FIG. 1 also illustrates a network slice selection function (NSSF) device 109 and a network slice specific authentication and authorization function (NSSAAF) device 111 for each network slice.

Each of the devices illustrated in FIG. 1 may be implemented as one server or device or may be implemented as a network slice instance. When implemented as a network slice instance, two or more identical or different network slice instances may be implemented in one server or device, or one network slice instance may be implemented in two or more servers or devices.

Each NF may support the following functions.

The AUSF 110 may process and store data for authenticating the UE.

The AMF 103 may provide functions for per-UE access and mobility management and may connect basically to one AMF per UE. Specifically, the AMF 103 may support such functions as inter-core network (CN) node signaling for mobility between 3GPP access networks, radio access network (RAN) CP interface (i.e., N2 interface) termination, NAS signaling termination (N1), NAS signaling security (NAS ciphering) and integrity protection, AS security control, registration management (registration area management), connectivity management, idle mode UE reachability (including controlling and performing paging retransmission), mobility management control (subscription and policy), intra-system mobility and inter-system mobility support, support of network slicing, SMF selection, lawful intercept (for interface to AMF event and LI system), transfer of session management (SM) messages between a UE and an SMF, transparent proxy for SM message routing, access authentication, access authorization including a roaming authority check, transfer of SMS messages between the UE and a short message service function (SMSF), security anchor function (SEA), and security context management (SCM). All or some of the functions of the AMF 103 may be supported in a single AMF instance operating as one AMF.

The DN 112 may mean, e.g., an operator service, Internet access, or a third party service. The DN 112 may transmit a downlink protocol data unit (PDU) to the UPF 105 or receive a PDU transmitted from a UE 101 from a UPF 105.

The PCF 107 may receive information about packet flow from application server and provide the function of determining the policy such as mobility management or session management. Specifically, the PCF 107 may support functions such as support of a unified policy framework for controlling network operations, providing a policy rule to allow CP function(s) (e.g., AMF or SMF) to execute a policy rule, and implementation of a front end for accessing subscription information related to policy decision in the user data repository (UDR).

The SMF 104 provides session management function and, if a UE has multiple sessions, this may be managed per session by a different SMF. Specifically, the SMF 104 may support such functions as session management (e.g., session establishment, modification, and release including maintaining tunnel between the UPF and the AN node), UE IP address allocation and management (optionally including authentication), selection and control of a UP function, traffic steering settings for routing traffic to a proper destination in UPF, interface termination towards policy control functions, execution of control part of policy and QoS, lawful intercept (for interface to SM event and LI system), termination of SM part of NAS message, downlink data notification, AN-specific SM information publisher (transferred via the AMF and N2 to the AN), SSC mode decision of session, and roaming function. As described above, some or all of the functions of the SMF 104 may be supported within a single SMF instance operating as one SMF.

The UDM 106 may store, e.g., user's subscription data, policy data. The UDM 106 may include two parts, i.e., application front end (FE) (not shown) and user data repository (UDR) (not shown).

The FE may include a UDM FE in charge of location management, subscription management, and credential processing and a PCF-FE in charge of policy control. The UDR may store data required for the functions provided by UDM-FE and the policy profile required by PCF. The data stored in the UDR may include policy data and user subscription data including a subscription identifier, security credential, access and mobility-related subscription data, and session-related subscription data. The UDM-FE may access the subscription information stored in UDR and support such functions as authentication credential processing, user identification handling, access authentication, registration/mobility management, subscription management, and SMS management.

The UPF 105 may transfer the downlink PDU, received from the DN 112, to the UE 101 via the (R) AN 102 and transfer the PDU, received from the UE 101 via the (R) AN 102, to the DN 112. Specifically, the UPF 105 may support such functions as anchor point for intra/inter RAT mobility, external PDU session point of interconnection to data network, packet routing and forwarding, packet inspection and user plane part of policy rule, lawful intercept, traffic usage reporting, uplink classifier for supporting routing of traffic flow to data network, branching point for supporting multi-home PDU session, QoS handling (e.g., packet filtering, gating, uplink/downlink rate execution) for user plane, uplink traffic verification (SDF mapping between service data flow (SDF) and QoS flow), transport level packet marking in uplink and downlink, downlink packet buffering, and downlink data notification triggering. All or some of the functions of the UPF 105 may be supported in a single UPF instance operating as one UPF.

The AF 108 may interact with 3GPP core network for providing services (e.g., supporting such functions as application influence on traffic routing, network capability exposure access, and interactions with policy framework for policy control).

The (R) AN 102 collectively refers to new radio access technologies that support both E-UTRA (evolved E-UTRA) which is an evolution from 4G radio access technology and new radio access technology (NR: New Radio) (e.g., gNB).

A gNB may support such functions as functions for radio resource management (i.e., radio bearer control, radio admission control, connection mobility control, dynamic allocation of resources (i.e., scheduling) to the UE 101 on uplink/downlink), internet protocol (IP) header compression, encryption and integrity protection of user data stream, where routing to AMF 103 is not determined from information provided to the UE 101, selection of an AMF 103 when the UE 101 attaches, routing of user plane data to UPF(s) 105, routing of control plane information to AMF 103, connection setup and release, scheduling and transmission (generated from AMF 103) of paging message, scheduling and transmission (generated from AMF 103 or operating and maintenance (O&M)) of system broadcast information, measurement and measurement reporting configuration for mobility and scheduling, transport level packet marking on uplink, session management, support of network slicing, QoS flow management and mapping to data radio bearer, support of a UE in inactive mode, distribution of NAS messages, NAS node selection, radio access network sharing, dual connectivity, and tight interworking between NR and E-UTRA.

The UE 101 may mean a user device. The user device may be referred to as a terminal, mobile equipment (ME), or mobile station (MS). Further, the user device may be a portable device, such as a laptop computer, mobile phone, personal digital assistant (PDA), smartphone, or multimedia device or may be a non-portable device, e.g., a personal computer (PC) or vehicle-mounted device. In the following description, the user device is referred to as user equipment (UE) or terminal.

In FIG. 1, the network exposure function (NEF) device and the NF repository function (NRF) device are not illustrated for clarity of description, but all of the NFs illustrated in FIGS. 2 to 5 described below may interact with the NEF and the NRF if necessary.

The NRF is described. The NRF (not shown in FIG. 1) may support the service discovery function. When receiving a second NF discovery request from the first NF instance, information about the second NF instance discovered after performing a second NF discovery operation may be provided to the first NF instance. Further, available NF instances and their supporting service may be maintained.

Meanwhile, although FIG. 1 illustrates an example reference model in which the UE accesses one DN using one PDU session for ease of description, the disclosure is not limited thereto.

The UE 101 may simultaneously access two data networks (i.e., local and central) using multiple PDU sessions. In this case, two SMFs may be selected for different PDU sessions. However, each SMF may have the capability of controlling both the local and central UPFs in the PDU session.

Further, the UE 101 may simultaneously access two (i.e., local and central) data networks provided in a single PDU session.

In the 3GPP system, a conceptual link connecting NFs in the 5G system is defined as a reference point. Example reference points included in the 5G system architecture represented in FIG. 1 are provided as follows:

N1: the reference point between the UE and the AMF;

N2: the reference point between (R) AN, and AMF;

N3: the reference point between (R) AN, and UPF;

N4: the reference point between the SMF and the UPF;

N5: the reference point between the PCF and the AF;

N6: the reference point between UPF and data network;

N7: the reference point between the SMF and the PCF;

N8: the reference point between the UDM and the AMF;

N9: the reference point between two core UPFs;

N10: the reference point between the UDM and the SMF;

N11: the reference point between the AMF and the SMF;

N12: the reference point between the AMF and the AUSF;

N13: the reference point between UDM and authentication server function (AUSF);

N14: the reference point between two AMFs; and

N15: the reference point between PCF and AMF in non-roaming scenario and reference point between PCF in visited network and AMF in roaming scenario.

In the following description, terminal may refer to the UE 101, and the terms "UE" and "terminal" may be interchangeably used. In this case, terminal may be appreciated as the UE 101 unless defined otherwise.

The UE accesses the data network (e.g., a network providing an Internet service) through the 5G system and establishes a session and may identify each data network using an identifier called the data network name (DNN). The DNN may be used to determine, e.g., the NF related to the user plane, inter-NF interface, and user policy when the UE establishes a session with the network system. The DNN may be used, e.g., to select SMF and UPF(s) for the PDU session and may be used to select the interface(s) (e.g., N6 interface) between the data network and the UPF for the PDU session. The DNN may be used to determine a policy of a mobile communication carrier to be applied to the PDU session.

Figure 2:
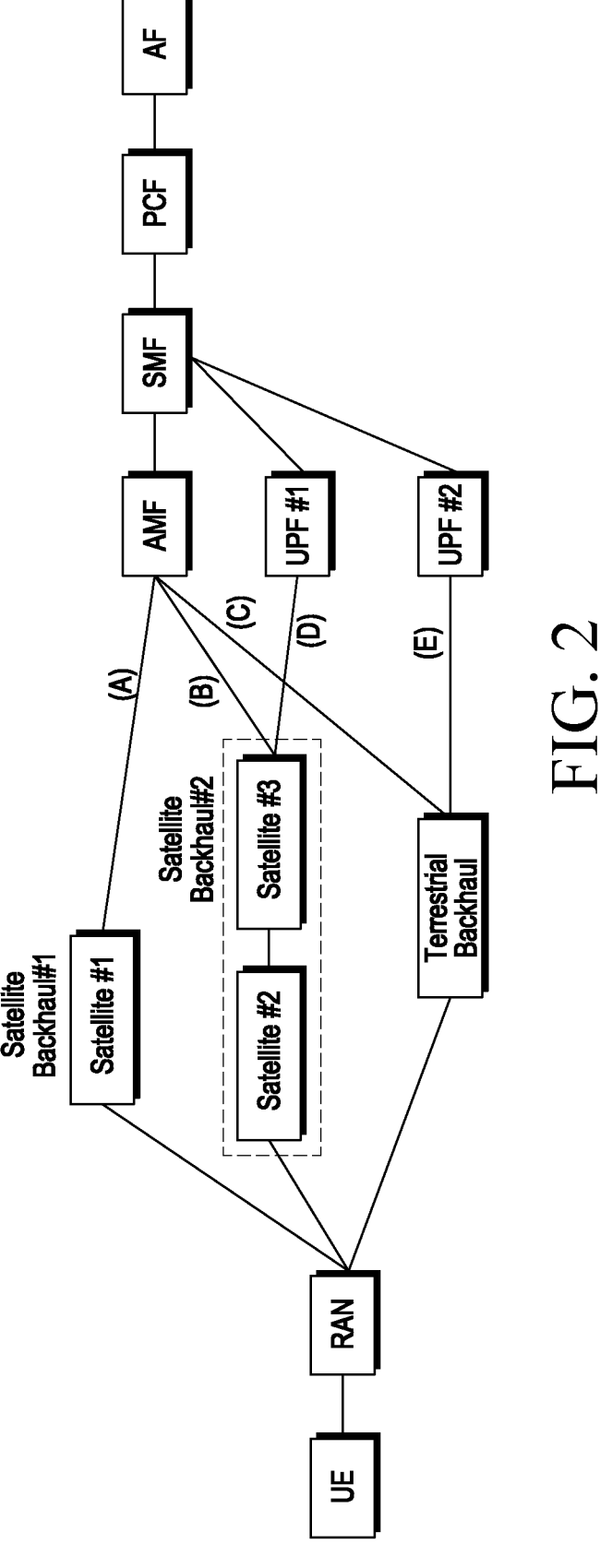
FIG. 2 illustrates a 5G system structure in a case where one or more backhaul network connections are possible between one RAN and one 5G core network according to an embodiment of the present disclosure.

FIG. 2 illustrates a 5G system structure in a case where one or more backhaul network connections are possible between one RAN and one 5G core network according to an embodiment of the present disclosure.

At least one control plane backhaul network and/or at least one user plane backhaul network may be connected between one RAN and one core network. The control plane backhaul network may connect the RAN and the AMF and may use the N2 interface (e.g., (A), (B), and (C) of FIG. 2). The user plane backhaul network may connect the RAN and the UPF and may use the N3 interface (e.g., (D) and (E) of FIG. 2). Types of backhaul networks may include terrestrial backhaul networks (e.g., (C) and (E) of FIG. 2) and non-terrestrial backhaul networks (using satellites, drones, etc.) (e.g., (A), (B), and (D) of FIG. 2). The satellite backhaul network may connect one or more satellites (e.g., (B) and (D) of FIG. 2).

For example, as illustrated in (A) of FIG. 2, a first satellite backhaul network Satellite Backhaul #1 may be connected between the RAN and the AMF as a control plane backhaul network, and the first satellite backhaul network may be connected to one satellite Satelite #1. As illustrated in (B) and (D) of FIG. 2, the second satellite backhaul network Satellite Backhaul #2 may be connected between the RAN and the AMF and between the RAN and the first UPF UPF #1, as the control plane backhaul network and the user plane backhaul network, respectively, and the second satellite backhaul network may be connected to two satellites Satelite #2 and Satelite #3. As illustrated in FIGS. (C) and (E) of FIG. 2, the terrestrial backhaul network may be connected between the RAN and the AMF and between the RAN and the second UPF UPF #2, as the control plane backhaul network and the user plane backhaul network, respectively.

The network delay occurring in the backhaul network may be considered when the PCF determines the SM Policy. For example, the PCF may include a packet delay budget (PDB) value when configuring a QoS parameter suitable for a service provided to the UE. The PDB corresponds to an upper limit of packet delay that may be allowed between the UE and the N6 interface termination UPF. Accordingly, when the satellite network is used in the section between the RAN and the UPF, an SM policy including a PDB value longer than when the terrestrial network is used may need to be determined.

Network delays occurring in the backhaul network may dynamically change, and such dynamic backhaul network delays may be considered when the PCF determines the SM policy. For example, when the backhaul network connecting the RAN and the UPF is a network connected to one or more satellites (D of FIG. 2), and when the satellite provides moving satellite access, the backhaul network delay may vary depending on the location of the UE and/or the location of the mobile satellite. In particular, in the case of a moving satellite constellation network, satellites constituting the satellite constellation move in a predetermined period along a predetermined, and a path in the moving satellite constellation in which packets are routed according to the location of the UE is variable. As an example, the UE may transmit and receive packets to and from the UPF through only one satellite at a specific time, and may transmit and receive packets to and from the UPF through two satellites at another time, and each backhaul network delay may vary depending on the number of satellites that have passed through.

In the communication system in which the backhaul network delay may dynamically change, the PCF may determine the SM policy adaptively to the backhaul network delay value, and to this end, the SMF may request the RAN and/or the UPF to measure and report the uplink and/or downlink packet delay between the RAN and the UPF. The SMF may report the measurement value received from the RAN and/or the UPF to the PCF to determine whether the PCF may determine a new SM policy (which may include a new PDB value). In this case, the PCF may communicate with the AF to determine whether the reported backhaul network delay satisfies the user service requirements. When the PCF determines a new SM policy, the PCF may provide the SMF with a new SM Policy.

FIG. 3 illustrates a method for managing policy control and charging rules based on a dynamic backhaul network delay according to an embodiment of the present disclosure.

The PCF may monitor the delay value of the satellite backhaul network and adaptively determine the PCC rule. To this end, the PCF may provide PCC rule Information describing rules for monitoring the delay value of the satellite backhaul network to the SMF. The SMF may provide the PCC rule Information to each of the RAN and/or UPF. The RAN and UPF may measure the network delay of the satellite backhaul network section based on the information indicated by the QOS SMF.

Referring to FIG. 3, the PCF may provide QoS monitoring for dynamic satellite backhaul control to the SMF to instruct the SMF how to monitor satellite backhaul network delay.

The QoS monitoring information may include at least one of the following parameters:

QoS parameter(s) to be measured: may indicate the QoS parameters to be measured. may include UL packet delay, DL packet delay, or round trip packet delay;

Reporting frequency: may indicate the reporting frequency. When a specific event occurs, the definition of the event may be used, and if cyclic, the cycle value may be used. When the QoS parameter to be measured is equal to or larger than the threshold below, or when the QoS parameter to be measured is equal to or less than the threshold below may be used as the definition of the event;

Threshold Value(s): may indicate a predetermined value of the QoS parameter to be measured; and Target of reporting: may indicate the target NF of reporting. For example, the PCF, AF, NEF, or other NFs defined by the PCF may be included.

Indication of direct event notification: The UPF may instruct to report to the target of reporting directly without relying on the SMF.

Upon receiving QoS monitoring for dynamic satellite backhaul control information from the PCF, the SMF may provide a QoS monitoring indication, QoS monitoring reporting frequency, and/or QoS monitoring threshold value to the RAN in a PDU session establishment/modification procedure.

QoS Monitoring Indication: may instruct the RAN to measure QoS parameter values between the RAN and the UPF. The SMF may instruct to measure packet delay for QoS parameters corresponding to some or all of the QoS parameter(s) to be measured provided by the PCF.

QOS Monitoring reporting frequency: may indicate the frequency at which the RAN may measure the QoS parameter and reports the QoS parameter to the SMF. The SMF may determine the reporting frequency by determining a value that may meet the reporting frequency condition provided by the PCF. For example, even when the reporting frequency provided by the PCF is a specific event, the SMF may determine a time value sufficient for the SMF to recognize the event and indicate to the RAN. As another example, when the reporting frequency provided by the PCF is a constant frequency, the SMF may determine a value equal to or different from the frequency time value provided by the PCF and indicate the value to the RAN.

QoS Monitoring Threshold value: may indicate a constant value of the QoS parameter value to be measured by the RAN. The SMF may determine the QoS monitoring threshold value by determining a value that may satisfy the reporting frequency and/or threshold value conditions provided by the PCF. For example, the SMF may determine a value equal to or different from the threshold value provided by the PCF and indicate the value to the RAN.

When the SMF receives the QoS monitoring for dynamic satellite backhaul control information from the PCF, the SMF may provide the QoS monitoring policy to the UPF in the PDU session establishment/modification procedure. The QoS monitoring policy may include QoS parameter(s) to be measured, reporting frequency, threshold value(s), target of reporting, and/or indication of direct event notification. Each value may be determined by the SMF based on the value provided by the PCF. For example, upon receiving the NWDAF and indication of direct event notification as the target of reporting value from the PCF, the SMF may provide the same to the UPF to allow the UPF to directly report the measured value to the NWDAF. Such an example may be implemented if the PCF intends to analyze the dynamic change pattern of the satellite backhaul network through the NWDAF and refer to it to determine the PCC rule at the request of the AF or the PCF's own judgment.

FIG. 4 illustrates a method for managing policy control and charging rules based on a dynamic backhaul network delay according to an embodiment of the present disclosure.

The policy control and charging rule (PCC Rule) may include a policy control request trigger (PCRT) relevant for SMF. The PCF may provide the SMF with a PCRT related to the SMF in the SM policy association establishment/modification procedure. (For example, the PCF may transmit the PCRT to the SMF through an Npcf_SMPolicyControl_Create response message and an Npcf_SMPolicyControl_Update response message).

When the SMF receives the PCRT related to the SMF from the PCF, the SMF may request the update of the SM policy association by communicating with the PCF according to the description of the PCRT when an event that satisfies the report condition described by the PCRT occurs. (To this end, for example, the SMF may transmit an Npcf_SMPolicyControl_Update request message to the PCF).

When an event satisfying the report condition described by the PCRT occurs from the SMF and the information requested in the description of the PCRT is received, the PCF may determine whether the SM policy previously provided to the SMF needs to be updated. In this case, the PCF may communicate with the AF to transmit and receive information necessary for determining the SM Policy. The PCF may determine that the SM Policy needs to be updated and provide the updated SM Policy to the SMF. (To this end, for example, the PCF may transmit an Npcf_SmPolicyControl_Update response message to the SMF. Meanwhile, the update may include correction and/or deletion.

When the PCF receives a request from the AF to indicate the occurrence of a specific event and related information (for this purpose, for example, the AF may transmit the definition of the event to the PCF through the Npcf_EventExposure_Subscibe message), the PCF may inform the AF (for this purpose, for example, the PCF may transmit the Npcf_EventExposure_Notify message to the AF). The AF may request the PCF to transfer QoS monitoring for dynamic satellite backhaul control for the above-described dynamic satellite backhaul control to the AF.

Referring to FIG. 4, the PCF may instruct the SMF to provide PCRTs related to the SMF to monitor and report dynamically changing satellite backhaul network delays. QoS selected by SMF for dynamic satellite backhaul: When the SMF recognizes the QoS parameter that may be satisfied through the satellite backhaul network in which the network delay in the UPF may dynamically change, the PCF may be instructed to report (1) the QoS flow identifier including the satisfied QoS parameter and/or (2) the measured QoS parameter value. For example, when in the PDU session establishment/modification procedure, one or more QoS rules and one or more alternative QoS rules are received from the PCF in consideration of the dynamic satellite backhaul network delay and, after requesting one or more candidate UPFs to which the SMF may be connected to measure the backhaul network delay, the UPF is selected based on the measured value, if there are one or more QoS rules that may be satisfied by the selected UPF, the SMF may recognize that the QoS selected by SMF for dynamic satellite backhaul PCRT condition is satisfied, and report the QoS rules to the PCF. If one or more QoS rules are satisfied, the PCF may determine one and notify the SMF. Alternatively, if one or more QoS rules are satisfied, the SMF may determine one and notify the PCF. Alternatively, if no QoS rule is satisfied, the SMF may notify the PCF that there is no QoS rule satisfied.

QOS Monitoring for dynamic satellite backhaul control: If there is a dynamic backhaul network delay value measured by the UPF and/or the RAN, the PCF may be instructed to report the related QoS parameter value. For example, when the PCF provides the PCC rule with QoS monitoring for dynamic satellite backhaul control PCC rule information as described above with reference to FIG. 3, the PCF may instruct to report the QoS parameter measurement result requested by the PCF.

In the disclosure, the QoS selected for SMF for dynamic satellite backhaul may be referred to as a policy control request trigger condition or a first policy control request trigger condition for the case where the SMF recognizes a QoS parameter that may be satisfied through a satellite backhaul network in which a network delay in a UPF may dynamically change, and the QoS monitoring for dynamic satellite backhaul may be referred to as a policy control request trigger condition or a second policy control request trigger condition for QoS monitoring for dynamic satellite backhaul delay control.

Figure 5A:
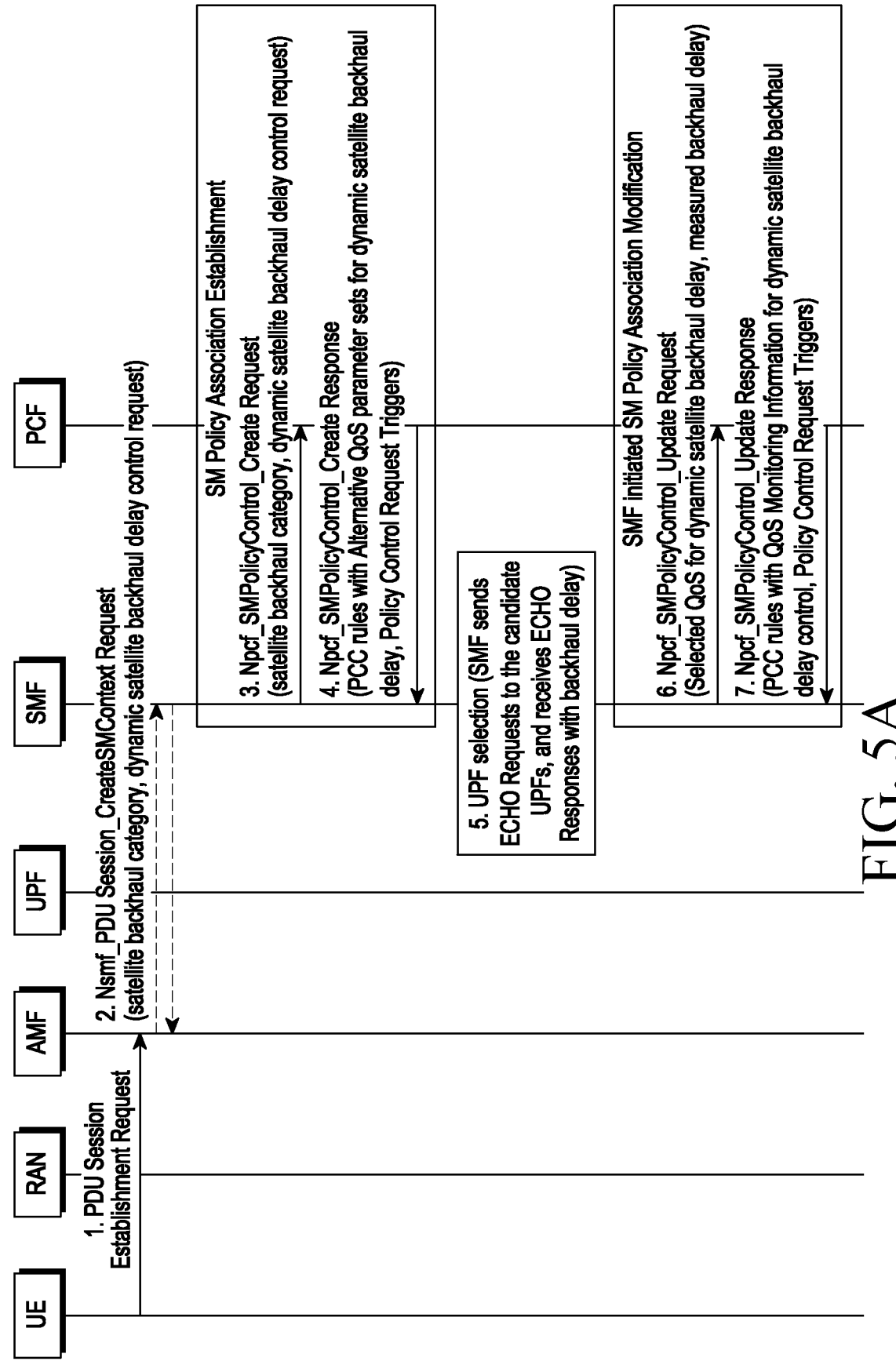
FIGS. 5A and 5B illustrate a method for session management based on a dynamic backhaul network delay according to an embodiment of the present disclosure.
Figure 5B:
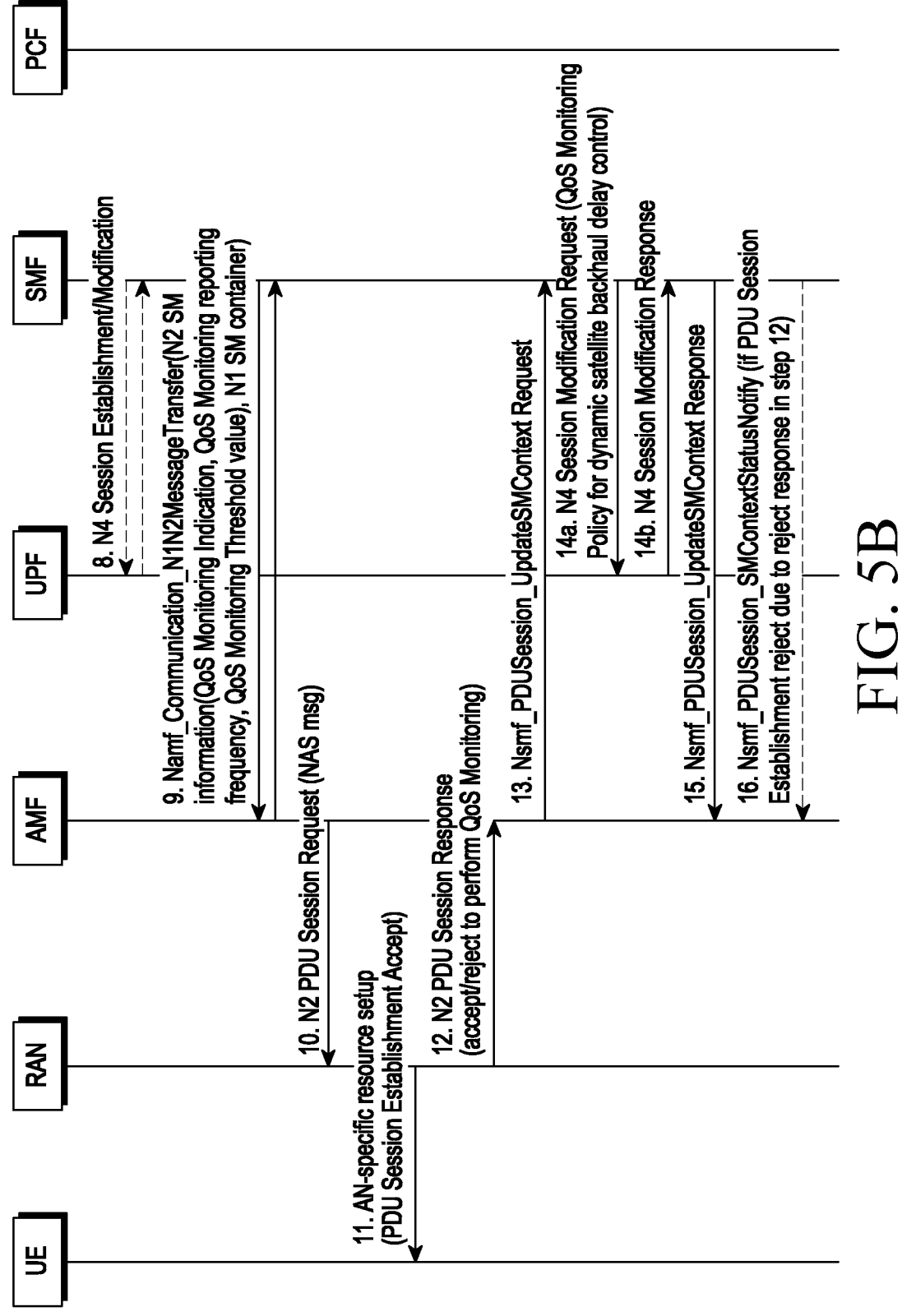

FIGS. 5A and 5B illustrate a method for session management based on a dynamic backhaul network delay according to an embodiment of the present disclosure.

Step 1: The UE may transmit a PDU session establishment request message to the AMF through the RAN.

Step 2: The AMF may determine at least one of (1) to (5) in relation to the type of backhaul network present between the RAN and the core network.

(1) Whether there is one type of backhaul network between the current RAN and the core network, or whether there are more than one type of backhaul network (including, e.g., when only a terrestrial backhaul network is present between the current RAN and the core network, or when only geostationary or geosynchronous earth orbit (GEO) (or medium earth orbit (MEO) or low earth orbit (LEO)) satellite backhaul network is present, or when GEO satellite backhaul, LEO satellite backhaul, and terrestrial backhaul networks are present).

(2) Whether only the same backhaul network may be used for the control plane and the user plane.

(3) Whether different types of backhaul networks may be used for the control plane and the user plane.

(4) Types of backhaul networks used (or may be used) for the control plane.

(5) Types of backhaul networks used (or may be used) in the user plane.

The AMF may use at least one piece of information among (A) to (E) in determining the type of the backhaul network.

(A) Global RAN Node ID received from the RAN.

(B) UE location information received from the RAN (which may include, e.g., Tracking Area (TA) ID, Cell ID, PLMN ID, and country).

(C) Information about the backhaul network type received from RAN.

(D) Network operation and maintenance information (operations, administration and management or operations, administration and maintenance (OA&M or OAM)).

(E) AMF configuration information, etc.

The AMF may select the SMF for session management. The AMF may transmit a message (Nsmf_PDUSession-_CreateSMContext Request) requesting establishment of a PDU session to the SMF. If the AMF determines that the type of backhaul network used in the control plane is a satellite backhaul network, the AMF may provide a satellite backhaul category to the SMF. The value of the satellite backhaul category may include NR (GEO), NR (MEO), NR (LEO), NR (OTHERSAT), and the like, depending on the type of satellite. For example, when the AMF determines that the RAN is using the satellite backhaul network based on the Global RAN Node ID received from the RAN through the N2 interface during the registration process of the UE, the type of the satellite backhaul network being used by the RAN may be written to the value of the satellite backhaul category value.

The AMF may determine whether the type of backhaul network used (or may be used) in the control plane and/or user plane is a type of a backhaul network in which the network delay value may dynamically change. The backhaul network in this case may include a terrestrial or non-terrestrial backhaul network, such as a satellite or a drone. In the following description, the case where a satellite backhaul network in which the network delay value may be dynamically changed is used (or may be used) is described. However, it is obvious to one of ordinary skill in the art that the same/similar method may be applied even when a dynamically changing terrestrial backhaul network is used.

Upon determining that the type of backhaul network used (or may be used) in the control plane and/or user plane is a satellite backhaul network in which the network delay value may dynamically change, the AMF may inform the SMF. For example, the AMF may recognize that one or more types of backhaul networks may be present between the RAN and the core network in the NG setup procedure with the RAN. In this case, even if the backhaul network used in the current control plane is the terrestrial backhaul network in the registration procedure of the UE, the AMF may determine that there is a possibility that the backhaul network may be changed to the satellite backhaul network in the future, determine that the type of the backhaul network that may be used in the control plane and/or the user plane is the satellite backhaul network in which the network delay value may be dynamically changed, and notify the SMF thereof.

As another example, the AMF may recognize that different types of backhaul networks may be used in the control plane and the user plane in the NG setup procedure with the RAN. In this case, even if the backhaul network used in the current control plane is the terrestrial backhaul network in the registration procedure of the UE, the AMF may determine that there is a possibility that the satellite backhaul network may be used in the user plane, determine that the type of the backhaul network that may be used in the control plane and/or the user plane is the satellite backhaul network in which the network delay value may dynamically change, and notify the SMF thereof.

As another example, the AMF may recognize that different types of backhaul networks may be used in the control plane and the user plane in the NG setup procedure with the RAN. In this case, the AMF may determine that there is a possibility that a satellite backhaul network of a different type from the satellite backhaul network used in the current control plane determined in the registration procedure of the UE may be used in the user plane (for example, NR (GEO) satellite backhaul may be used in the CP, and NR (LEO) satellite backhaul may be used in the UP), determine that the type of backhaul network that may be used in the control plane and/or the user plane is a satellite backhaul network in which a network delay value may dynamically change, and notify the SMF thereof.

As another example, the AMF may recognize that a satellite backhaul network connected by one or more satellites may be used between the RAN and the core network in the NG setup procedure with the RAN or the registration procedure of the UE. In this case, the AMF may determine that the type of the backhaul network that may be used in the control plane and/or the user plane is a satellite backhaul network in which the network delay value may dynamically change, and notify the SMF thereof. When the AMF determines that the type of the backhaul network used (or usable) in the control plane and/or the user plane is a satellite backhaul network in which the network delay value may dynamically change, the AMF may notify the SMF that the delay value of the satellite backhaul network is dynamically changed, and may provide a dynamic satellite backhaul delay control request indication.

When the AMF determines that different types of backhaul networks may be used for the control plane and the user plane, and/or determines that a satellite backhaul network in which a network delay value may dynamically change may be used for the user plane, and/or determines that a UPF may be selected based on the backhaul network delay value of the user plane, the AMF may transmit a global RAN node ID (RAN ID), together with a dynamic satellite backhaul network delay control request indication, to the SMF.

When it is determined that a satellite backhaul network in which a network delay value may dynamically change may be used in the control plane and/or the user plane, the AMF may transmit, to the SMF, information for predicting a dynamic variation pattern, pattern, or period of the backhaul delay value. For example, when it is determined that the satellite backhaul network including the mobile satellite constellation is used in the control plane and/or the user plane, the AMF may transmit the information to the SMF when it is possible to predict the backhaul network delay change pattern of the mobile satellite constellation by the information provided by the satellite operator, the information provided by the RAN, or the settings inside the AMF.

As a specific example, in the case of a mobile satellite constellation, it may move at a certain period and orbit, and at a specific time interval, the connection between satellites may move away or get closer, and at this time, the period time of the satellite constellation, or a specific time at which the connection between satellites temporarily moves away or gets closer may be transmitted to the SMF. The AMF may transmit, to the SMF, information for predicting the dynamic variation pattern, pattern, or period of the backhaul delay value together with the dynamic satellite backhaul network delay control request indication. The SMF may determine a backhaul network delay monitoring rule, etc. based on this information. As an embodiment, a dynamic satellite backhaul network delay control request indication, together with a satellite backhaul category, may be included in a message (Nsmf_PDUSession_CreateSMContext Request) requesting establishment of a PDU session. As described above, the value of the satellite backhaul category may be set to a different value depending on the type of satellite.

Step 3: The SMF may request the PCF to create a session management policy. As an embodiment, the SMF may transmit a message (Npcf_SMPolicyControl_Create Request) requesting creation of a session management policy to the PCF.

The SMF may provide the satellite backhaul category and/or the dynamic satellite backhaul delay control request to the PCF upon receiving the satellite backhaul category and/or the dynamic satellite backhaul delay control request from the AMF. According to an embodiment, the SMF may include the satellite backhaul category and/or the dynamic satellite backhaul delay control request received from the AMF in a message (Npcf_SMPolicyControl_Create Request) requesting to create a session management policy and transmit the same to the PCF.

Even if the SMF receives or does not receive the satellite backhaul category and/or the dynamic satellite backhaul delay control request from the AMF, the SMF may transmit the dynamic satellite backhaul delay control request to the PCF when it is determined that the type of the backhaul network that may be used in the control plane and/or the user plane is a satellite backhaul network in which the network delay value may dynamically change. According to an embodiment, even if the SMF does not receive the satellite backhaul category from the AMF, when the SMF receives the dynamic satellite backhaul delay control request, the SMF may transmit the dynamic satellite backhaul delay control request to the PCF.

As another example, even though the SMF does not receive the satellite backhaul category from the AMF, when the SMF receives the dynamic satellite backhaul delay control request and the global RAN node ID (RAN ID) from the AMF, if it may be determined that the RAN indicated by the RAN ID is a RAN capable of using different types of backhaul networks on the control plane and the user plane, or that there are one or more types of backhaul networks capable of being used on the control plane and/or the user plane, the SMF may transmit the dynamic satellite backhaul control request to the PCF. As another example, even if neither the satellite backhaul category nor the dynamic satellite backhaul delay control request is received from the AMF, the SMF may transmit the dynamic satellite backhaul delay control request to the PCF when it is determined according to a preset method that the type of the backhaul network that may be used in the control plane and/or the user plane is a satellite backhaul network in which the network delay value may dynamically change.

Even if the SMF receives or does not receive information for predicting the dynamic variation pattern, pattern, or period of the backhaul delay value from the AMF, the SMF may transmit the information to the PCF when the mobile satellite constellation may predict the backhaul network delay variation pattern by the information provided by the satellite operator, the information provided by the RAN, the information provided by the AMF, or settings within the SMF.

Step 4: When the PCF receives the satellite backhaul category and/or the dynamic satellite backhaul delay control request from the SMF, the PCF may create a policy control and charging rule (PCC rule) in consideration of the dynamic satellite backhaul network delay.

The PCC rule may include QoS parameter(s), and the QoS parameter may include a packet delay budget (PDB), a packet error rate (PER), and the like. For example, when the PCF receives a satellite backhaul category and a dynamic satellite backhaul delay control request from the SMF, the PCF may determine QoS parameter values in consideration of a network delay time that may occur in a satellite backhaul network of a type indicated by the satellite backhaul category, and may further determine alternative QoS parameter values applicable when the satellite backhaul network delay time is longer or shorter than in a normal situation. For example, when the satellite backhaul category value is NR (LEO) and the dynamic satellite backhaul delay control request is included, the PCF may provide packet delay budget values that may be allowed when one, two, or N satellites of the NR (LEO) type are involved as a QoS parameter or an alternative QoS parameter when it is determined that the backhaul network delay when N satellites of the NR (LEO) type are passed through is allowed considering the QoS requirement of the service provided to the user.

When the PCF receives the satellite backhaul category and/or the dynamic satellite backhaul delay control request from the SMF, the PCF may create a policy control request trigger condition that allows the SMF to initiate a procedure for policy control and modification of the charging rule in consideration of the dynamic satellite backhaul network delay. When the SMF recognizes that an event satisfying the policy control request trigger condition has occurred, the SMF may request the PCF to modify the session management policy.

The policy control request trigger condition may include a case in which the SMF recognizes that a change has occurred in the type of the backhaul network used in the control plane and/or the user plane. In this case, the SMF may provide the PCF with the type of the backhaul network after the change. For example, when the satellite backhaul category value received from the AMF is different from the previously received value, the SMF may recognize that a change has occurred in the type of the backhaul network used in the control plane and/or the user plane, and may provide the PCF with the post-change value. For example, if the satellite backhaul category value received from the AMF is different from the value previously received, the SMF recognizes that a change has occurred in the type of backhaul network used in the control plane and/or user plane, and the value after the change may be provided to the PCF.

The policy control request trigger condition may include a case in which the SMF recognizes a QoS parameter that may be satisfied through a satellite backhaul network in which a network delay in the UPF may dynamically change. In this case, the SMF may provide the PCF with a QoS parameter that may be satisfied and a value thereof (and/or a QoS rule identifier and/or a PCC rule identifier). Additionally, the SMF may provide the PCF with the backhaul network delay value measured by the UPF.

An example of the policy control request trigger information including at least one of the above-described policy control request trigger conditions may be the same as illustrated in FIG. 4.

The PCC rule and/or the policy control trigger condition(s) including the QoS parameter set(s) (e.g., the QoS parameter set and/or the alternative QoS parameter set) for the above-described dynamic satellite backhaul delay may be included in the response message (Npcf_SMPolicyControl_Create Response) to the message (Npcf_SMPolicyControl_Create Request) requesting the creation of the session management policy and may be transmitted from the PCF to the SMF.

According to an embodiment, the session management policy creation response message (Npcf_SMPolicy Control_Create Response) may further include QoS monitoring information for dynamic satellite backhaul delay control. An example of PCC rule information including QoS monitoring information for dynamic satellite backhaul delay control may be the same as illustrated in FIG. 3.

Step 5: The SMF may select the UPF in consideration of the user plane backhaul network delay. For example, when the SMF receives a satellite backhaul category and/or a dynamic satellite backhaul delay control request from the AMF in step 2, the SMF may request candidate UPFs searchable by the SMF to measure a backhaul network delay for RANs connectable through a GPRS Tunneling Protocol for User Plane (GTP-U) path, and may select a UPF suitable for the user plane based on the measured value. For example, the SMF may select the UPF providing the network delay value of the shortest GTP-U path as the UPF suitable for the user plane.

When the AMF additionally provides the RAN ID (e.g., the Global RAN Node ID) in step 2, the SMF may provide the RAN IDs to the candidate UPFs to make a limited request for the candidate UPFs to measure the network delay of the GTP-U path only for the corresponding RAN.

In the procedure in which the UPF measures the backhaul network delay through the GTP-U path, when the UPF transmits the ECHO request message to the RAN connected through the GTP-U path, and the RAN receiving the ECHO response message transmits the ECHO response message to the UPF, the UPF may measure the network delay of the GTP-U path based on the time required for the UPF to transmit the ECHO request message and receive the ECHO response message. Each of the candidate UPFs may provide the SMF with a network delay of the GTP-U path measured by itself.

Step 6: The SMF may request the PCF to modify the session management policy. As an embodiment, the SMF may transmit a message (Npcf_SMPolicyControl_Update Request) requesting to modify the session management policy to the PCF.

The SMF may determine, from the UPF, the QoS that may be satisfied by the network delay measurement value of the backhaul network used in the user plane (e.g., the network delay measurement value of the GTP-U path provided by the selected UPF in step 5), and may determine that the QoS parameter that may be satisfied through the satellite backhaul network in which the network delay may dynamically change in the UPF among the policy control request trigger condition(s) provided by the PCF in step 4 corresponds to the case where the SMF recognizes the QoS parameter. In this case, the SMF may provide the PCF with a QoS parameter that may be satisfied, a value thereof (and/or a QoS rule identifier and/or a PCC rule identifier), and a network delay measurement value of the backhaul network used in the user plane. As an embodiment, the SMF may include a QoS parameter that may be satisfied and a value thereof (and/or a QoS rule identifier and/or a PCC rule identifier) (i.e., a selected Qos for dynamic satellite backhaul delay) and/or a network delay measurement value (i.e., a measured backhaul delay) of the backhaul network used in the user plane in a message (Npcf_SMPolicyControl_Update Request) requesting modification of the session management policy and transmit the same to the PCF.

Step 7: The PCF may maintain or modify the PCC rule(s) provided in step 4 and provide the PCC rule(s) to the SMF in consideration of the network delay of the backhaul network used in the user plane and information on the QoS that may be satisfied and provide the PCC rule(s) to the SMF.

When the PCF receives the dynamic satellite backhaul delay control request in step 3, the PCF may provide the SMF with PCC rule information including QoS monitoring information for controlling the dynamic satellite backhaul delay. QoS monitoring for dynamic satellite backhaul control may include QoS parameter(s), a reporting frequency, and/or threshold value(s) to be measured. An example of PCC rule information including QoS monitoring information for dynamic satellite backhaul delay control may be the same as illustrated in FIG. 3.

The PCF may provide the SMF with a policy control request trigger condition for QoS monitoring for dynamic satellite backhaul delay control in consideration of the network delay of the backhaul network used in the user plane and information on the QoS that may be satisfied. An example of the policy control request trigger information including the above-described policy control request trigger condition may be the same as illustrated in FIG. 4.

The policy control request trigger condition for QoS monitoring for dynamic satellite backhaul delay control may be associated with a report condition (QOS monitoring information) indicated by the PCC Rule Information. For example, assuming that the QoS parameter to be measured is a round trip packet delay, the reporting frequency is when packet delay exceeds the threshold value, and the threshold value is 100 ms, the SMF may recognize that the policy control request trigger condition for QoS monitoring for dynamic satellite backhaul delay control is satisfied when the QoS monitoring result received from the UPF and/or the RAN includes a round trip packet delay of more than 100 ms and provide the PCF with the round trip packet delay value.

The PCC rule information including the QoS monitoring information for the dynamic satellite backhaul delay control and/or the policy control request trigger condition for the QoS monitoring for the dynamic satellite backhaul delay control described above may be included in the response message (Npcf_SMPolicyControl_Update Response) to the message (Npcf_SMPolicyControl_Update Request) requesting the session management policy modification and transmitted from the PCF to the SMF. As an embodiment, the response message (Npcf_SMPolicyControl_Update Response) may further include a policy control request trigger condition for QoS monitoring for dynamic satellite backhaul delay control and another policy control request trigger condition.

Step 8: The SMF may request the UPF to establish or modify the N4 session.

Step 9: When the SMF receives QoS monitoring for dynamic satellite backhaul control from the PCF, the SMF may provide the RAN with the QoS monitoring indication, the QoS monitoring reporting frequency, and/or the QoS monitoring threshold value to the RAN in the PDU session establishment/modification procedure. For example, based on the QoS monitoring information for dynamic satellite backhaul delay control received from the PCF in step 7, the SMF may provide the RAN with a QoS monitoring indication, a QoS monitoring reporting frequency, and/or a QoS monitoring threshold value to measure a network delay of an N3 section (a user plane interface section between the RAN and the UPF). The RAN may perform GTP-U path monitoring (e.g., the method described in step 5) on the UPF based on the received information. The description of the QoS monitoring indication (QOS monitoring indication), the QoS monitoring reporting frequency, and the QoS monitoring threshold value may reference, e.g., the QoS monitoring indication, the QoS monitoring reporting frequency, and the QoS monitoring threshold value described above with reference to FIG. 3.

Step 10: The AMF may transfer the information received in step 9 to the RAN.

Step 11: The RAN may accept the PDU session establishment request received from the SMF and transmit information related thereto to the UE, and may perform AN resource setup.

Step 12: In response to the QoS monitoring request of the SMF received through steps 9 to 10, the RAN may determine acceptance or rejection in QoS flow units, and may notify the SMF of the accepted or rejected QoS flow identifier(s) through the AMF. For example, when the internal load of the RAN is high, the RAN may refuse to perform QoS monitoring for dynamic satellite backhaul delay control on some or all of QoS flows using the same N3 interval backhaul network.

Step 13: The AMF may transfer information received from the RAN to the SMF.

Step 14a: The SMF may transmit an N4 session modification request message (N4 session modification request) to the UPF based on the QoS flow(s) in which the RAN accepts PDU session establishment. In this case, based on the QoS monitoring information for dynamic satellite backhaul delay control received from the PCF in step 7, the SMF may provide the UPF with a QoS monitoring policy for dynamic satellite backhaul delay control so as to measure a network delay of an N3 section (a user plane interface section between the RAN and the UPF). For example, as described above with reference to FIG. 3, when the SMF receives QoS monitoring for dynamic satellite backhaul control from the PCF, the SMF may provide the QoS monitoring policy to the UPF in the PDU session establishment/modification procedure. In this case, the SMF may determine the QoS monitoring policy based on the QoS monitoring information for controlling the dynamic satellite backhaul delay received from the PCF.

The QoS monitoring policy may include QoS parameter(s) to be measured, reporting frequency, threshold value(s), target of reporting, and/or indication of direct event notification. Each value may be determined by the SMF based on the value provided by the PCF. For example, upon receiving the NWDAF and indication of direct event notification as the target of reporting value from the PCF, the SMF may provide the same to the UPF to allow the UPF to directly report the measured value to the NWDAF. Such an example may be implemented if the PCF intends to analyze the dynamic change pattern of the satellite backhaul network through the NWDAF and refer to it to determine the PCC rule at the request of the AF or the PCF's own judgment.

The UPF may perform GTP-U path monitoring (the method described in step 5) on the RAN based on the received information.

The SMF may determine to reject PDU session establishment based on the QoS flow(s) accepted or rejected by the RAN for the QoS monitoring request for dynamic satellite backhaul delay control. For example, if there is no alternative method because there is no other UE or other PDU session that may be monitored for the backhaul network in the N3 section through which the rejected QoS flow is transmitted, the SMF may determine to reject the PDU session establishment request.

Step 14b: The UPF may transmit an N4 session modification response message corresponding to the N4 session modification request message to the SMF.

Step 15: The SMF may respond to step 13 to the AMF.

Step 16: Upon determining to reject PDU session establishment in step 14a based on the QoS flow(s) accepted or rejected for the QoS monitoring request for dynamic satellite backhaul delay control received from the RAN in step 12, the SMF may notify the AMF thereof.

Figure 6:
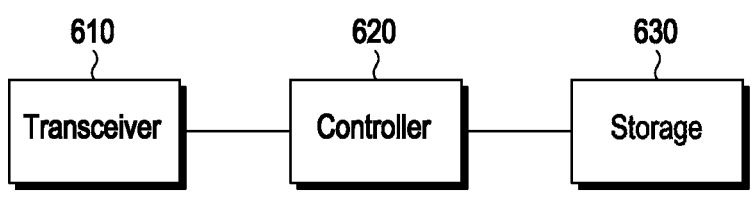
FIG. 6 illustrates a structure of a UE according to an embodiment of the present disclosure.

FIG. 6 is a view illustrating a structure of a UE according to an embodiment.

Referring to FIG. 6, the UE may include a transceiver 610, a controller 620, and a storage 630. In the disclosure, the controller may be defined as a circuit or application-specific integrated circuit or at least one processor.

The transceiver 610 may transmit and receive signals to/from other network entities. The transceiver 610 may receive system information from, e.g., a base station, and may receive a synchronization signal or a reference signal.

The controller 620 may control the overall operation of the terminal according to an embodiment. For example, the controller 620 may control inter-block signal flow to perform the operations according to FIGS. 1 to 5 described above. Specifically, the controller 620 may control operations as provided by the disclosure to support a method for session management based on a dynamic backhaul network according to an embodiment.

The storage 630 may store at least one of information transmitted/received via the transceiver 610 and information generated via the controller 620. For example, the storage 630 may store information/data/commands for performing operations according to FIGS. 1 to 5.

Figure 7:
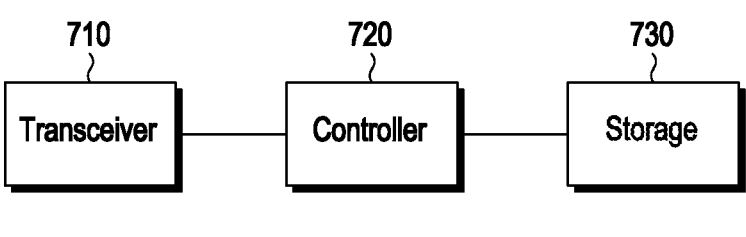
FIG. 7 illustrates a structure of a base station according to an embodiment of the present disclosure.

FIG. 7 illustrates a structure of a base station according to an embodiment of the present disclosure.

Referring to FIG. 7, the base station may include a transceiver 710, a controller 720, and a storage 730. In the disclosure, the controller may be defined as a circuit or application-specific integrated circuit or at least one processor.

The transceiver 710 may transmit and receive signals to/from other network entities. For example, the transceiver 710 may transmit system information to the UE and may transmit a synchronization signal or a reference signal.

The controller 720 may control the overall operation of the base station according to an embodiment. For example, the controller 720 may control inter-block signal flow to perform the operations according to FIGS. 1 to 5 described above. Specifically, the controller 720 may control operations as provided by the disclosure to support a method for session management based on a dynamic backhaul network according to an embodiment.

The storage 730 may store at least one of information transmitted/received via the transceiver 710 and information generated via the controller 1020. For example, the storage 730 may store information/data/commands for performing operations according to FIGS. 1 to 5.

Figure 8:
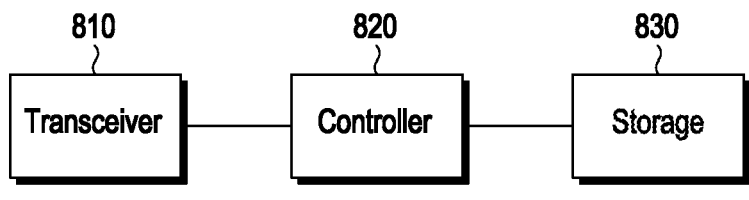
FIG. 8 illustrates a structure of a network function entity according to an embodiment of the present disclosure.

FIG. 8 illustrates a structure of a network function entity according to an embodiment of the present disclosure.

The network entity of FIG. 8 may be, e.g., one of the AMF, UPF, SMF, or PCF entities of FIGS. 1 to 5.

Referring to FIG. 8, the network entity may include a transceiver 810, a controller 820, and a storage 830. In the disclosure, the controller may be defined as a circuit or application-specific integrated circuit or at least one processor.

The transceiver 810 may transmit and receive signals to/from other network entities. The transceiver 810 may transmit/receive data and requests/responses to/from other network entities, for example.

The controller 820 may control the overall operation of the base station according to an embodiment. For example, the controller 820 may control inter-block signal flow to perform the operations according to FIGS. 1 to 5 described above. Specifically, the controller 1120 may control operations as provided by the disclosure to support a method for session management based on a dynamic backhaul network according to an embodiment.

In the above-described specific embodiments, the components included in the disclosure are represented in singular or plural forms depending on specific embodiments provided. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

The embodiments herein are provided merely for better understanding of the disclosure, and the disclosure should not be limited thereto or thereby. In other words, it is apparent to one of ordinary skill in the art that various changes may be made thereto without departing from the scope of the disclosure. Further, the embodiments may be practiced in combination. For example, the base station and the UE may be operated in a combination of parts of an embodiment and another embodiment. Further, other modifications based on the technical spirit of the above-described embodiments may be implemented in various systems, such as an FDD LTE system, a TDD LTE system, and a 5G or NR system.

Although the present disclosure has been described with various embodiments, various changes and modifications may be suggested to one skilled in the art. It is intended that the present disclosure encompass such changes and modifications as fall within the scope of the appended claims.

What is claimed:

1. A method of a session management function (SMF) in a wireless communication system, the method comprising:
   receiving, from an access and mobility management function (AMF), a first message including satellite backhaul category information indicating that a dynamic satellite backhaul is used:
   transmitting, to a policy control function (PCF), a second message including the satellite backhaul category information indicating that the dynamic satellite backhaul is used to trigger a quality of service (QOS) monitoring operation of the PCF for the dynamic satellite backhaul; and
   receiving from the PCF, in response to transmitting the second message, a third message including policy control and charging (PCC) rule information and policy control request trigger condition information related to the SMF,
   wherein the PCC rule information includes QoS monitoring information including information indicating a reporting frequency.

2. The method of claim 1, wherein the QoS monitoring information further includes at least one of:
   information indicating at least one QoS parameter to be measured;
   information indicating a threshold associated with the at least one QoS parameter to be measured; or information indicating whether to directly notify of an event.

3. The method of claim 2, wherein the PCC rule information further includes at least one of a QoS parameter set or an alternative QoS parameter set for a dynamic satellite backhaul delay control.

4. The method of claim 1, wherein the policy control request trigger condition information related to the SMF includes at least one of:
   a first policy control request trigger condition for a case in which the SMF recognizes a QoS parameter requirement that is satisfied by a satellite backhaul network in which a network delay dynamically changes in a user plane function (UPF); or
   a second policy control request trigger condition for QoS monitoring for a dynamic satellite backhaul delay control.

5. The method of claim 1, further comprising selecting a UPF based on a delay of a backhaul network associated with a user plane.

6. The method of claim 1, further comprising:
   transmitting, to the PCF, a session management policy modification request message including a measurement value of a delay of a backhaul network associated with a user plane; and
   receiving, from the PCF, a session management policy modification response message including the PCC rule information and the policy control request trigger condition information.

7. The method of claim 2, further comprising transmitting, to the AMF, at least one of QOS monitoring indicator information, QoS monitoring reporting frequency information, or QoS monitoring threshold information generated based on the QoS monitoring information.

8. The method of claim 5, further comprising transmitting, to the UPF, QOS monitoring policy information generated based on the QoS monitoring information, wherein the QoS monitoring policy information is used by the UPF to measure a network delay of section N3.

9. The method of claim 1, wherein the first message comprises satellite backhaul category information and a dynamic satellite backhaul delay control request indicator.

10. The method of claim 1, wherein dynamic satellite backhaul category information is determined by the AMF based on a global radio access network (RAN) node identification (ID).

11. An apparatus of a session management function (SMF) in a wireless communication system, the apparatus comprising:
   a transceiver; and
   a controller coupled to the transceiver, wherein the controller is configured to:
      receive, from an access and mobility management function (AMF), a first message including satellite backhaul category information indicating that a dynamic satellite backhaul is used,
      transmit, a policy control function (PCF), a second message including the satellite backhaul category information indicating that the dynamic satellite backhaul is used to trigger a quality of service (QOS) monitoring operation of the PCF for the dynamic satellite backhaul, and
      receive from the PCF, in response to transmitting the second message, a third message including policy control and charging (PCC) rule information and policy control request trigger condition information related to the SMF, wherein the PCC rule information includes QoS monitoring information including information indicating a reporting frequency.

12. The apparatus of claim 11, wherein the QoS monitoring information further includes at least one of:

information indicating at least one QoS parameter to be measured;

information indicating a threshold associated with the at least one QoS parameter to be measured; or information indicating whether to directly notify of an event.

13. The apparatus of claim 12, wherein the PCC rule information further includes at least one of a QoS parameter set or an alternative QoS parameter set for a dynamic satellite backhaul delay control.

14. The apparatus of claim 11, wherein the policy control request trigger condition information related to the SMF includes at least one of:

a first policy control request trigger condition for a case in which the SMF recognizes a QoS parameter requirement that is satisfied by a satellite backhaul network in which a network delay dynamically changes in a user plane function (UPF); or a second policy control request trigger condition for QoS monitoring for a dynamic satellite backhaul delay control.

15. The apparatus of claim 11, wherein the controller is further configured to select a UPF based on a delay of a backhaul network associated with a user plane.

16. The apparatus of claim 11, wherein the controller is further configured to:

transmit, to the PCF, a session management policy modification request message including a measurement value of a delay of a backhaul network associated with a user plane; and receive, from the PCF, a session management policy modification response message including the PCC rule information and the policy control request trigger condition information.

17. The apparatus of claim 12, wherein the controller is further configured to transmit, to the AMF, at least one of QoS monitoring indicator information, QoS monitoring reporting frequency information, or QoS monitoring threshold information generated based on the QoS monitoring information.

18. The apparatus of claim 15, wherein the controller is further configured to transmit, to the UPF, QOS monitoring policy information generated based on the QoS monitoring information, wherein the QoS monitoring policy information is used by the UPF to measure a network delay of section N3.

19. The apparatus of claim 11, wherein the first message comprises satellite backhaul category information and a dynamic satellite backhaul delay control request indicator.

20. The Apparatus of claim 11, wherein dynamic satellite backhaul category information is determined by the AMF based on a global radio access network (RAN) node identification (ID).

* * * * *